Aug. 3, 1965  E. ROSE  3,198,180
FUEL SUPPLY SYSTEM FOR INTERNAL-COMBUSTION ENGINES
Filed Oct. 9, 1961  3 Sheets-Sheet 1

INVENTOR.
Edgar Rose
BY
Andrus & Starke
Attorneys

INVENTOR.
Edgar Rose
BY
Andrus & Starke
Attorneys

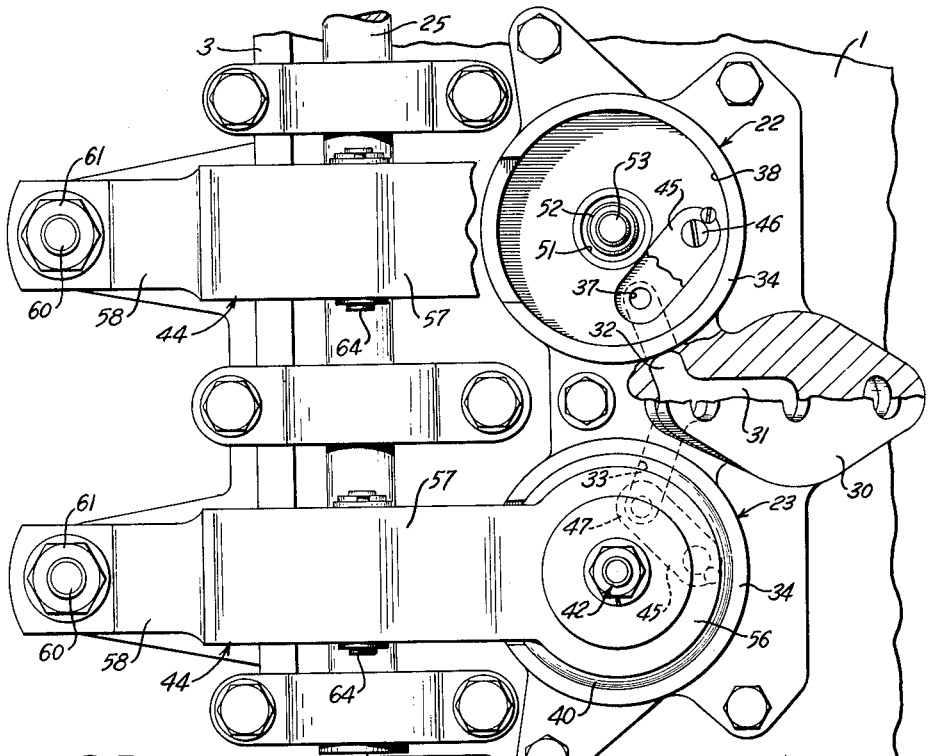
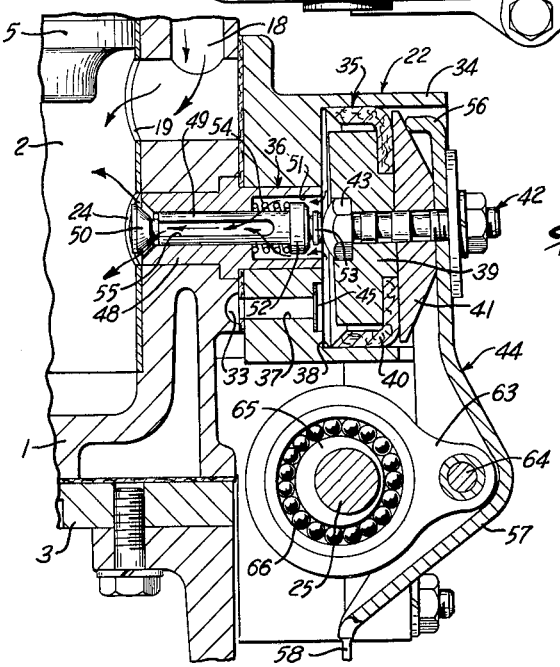
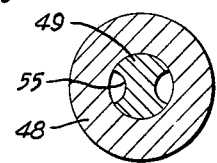
Fig. 4.
Fig. 5.
Fig. 6.
INVENTOR.
Edgar Rose
BY
Andrus & Starke
Attorneys

United States Patent Office 3,198,180
Patented Aug. 3, 1965

3,198,180
FUEL SUPPLY SYSTEM FOR INTERNAL-
COMBUSTION ENGINES
Edgar Rose, Oshkosh, Wis., assignor to Kiekhaefer Corporation, Chicago, Ill., a corporation of Delaware
Filed Oct. 9, 1961, Ser. No. 143,685
9 Claims. (Cl. 123—59)

This invention relates to a fuel supply system for internal-combustion engines and in particular for supplying an air-fuel mixture into a cylinder at a substantial velocity.

Internal-combustion engines of the two cycle variety include a precompression chamber wherein the air-fuel mixture is precompressed and then introduced into the cylinder under the relatively high pressure. When a multiplicity of cylinders obtain their air-fuel mixture through a single carburetor, a power loss results from an uneven distribution of the mixture to the various cylinders. Frictional losses in present carburetion systems contribute to a further power loss due to the reduction of volumetric efficiency of the engine.

In presently known injection systems, the fuel, without air, is normally injected directly through a suitable port. Generally, the fuel injection systems have been relatively expensive because of the complicated tooling and construction and the critical machining tolerances necessary. Also, air density detecting and compensating devices are required to insure optimum air-fuel ratios.

In a two cycle engine, the air-fuel mixture is introduced into the cylinder during the scavenging or exhaust cycle to positively force the exhaust or burnt gases from the cylinder.

In order to insure thorough discharge or scavenging of all burnt gases, a partial exhausting of the new air-fuel mixture during the latter part of the exhaust cycle has been required. Consequently, a certain amount of fuel is lost and the efficiency of the engine is substantially reduced.

The present invention is directed to providing a highly efficient injection of fuel into a single or multi-cylinder internal-combustion engine of either a two or four cycle variety through a relatively inexpensive and simple constructed carburetion and injection apparatus.

In accordance with the present invention, the operating mixture of air and fuel in a cylinder is obtained by separately injecting air and an enriched air-fuel mixture into the cylinder. A precompression and fuel metering unit is provided for injecting the enriched air-fuel mixture into the cylinder under a selected pressure.

The fuel system of the present invention may be designed with a single carburetor or fuel metering unit serving a plurality of cylinders with an improved and even fuel distribution. The combustion air is partially introduced externally of the carburetor and is not subjected to normal pressure drops resulting from the frictional losses in the carburetor system of the prior art. The greater velocity of the air-fuel mixture flow prevents fuel particles from settling in the flow stream in favor of the lower cylinder as in prior art systems.

In accordance with the present invention, the precompression chamber is connected through a passageway to the cylinder and includes a movable operating member adapted to move towards a normally closed valve during precompressing of the air-fuel mixture. At the correct time in the operating cycle of the associated cylinder, an operating member moves into engagement with the valve and positively opens the valve to admit the precompressed air-fuel mixture into the cylinder. The valve structure may include a plurality of grooves or openings through which the air-fuel mixture passes which grooves may assist in the atomizing of the air-fuel mixture.

In accordance with the present invention, as applied to a two-cycle engine, the scavenging air is introduced into the cylinder and initially forces the exhaust gases from the cylinder. After the exhaust gases have been substantially eliminated, the enriched air-fuel mixture is rapidly introduced into the cylinder which mixes with the scavenging air to provide the desired operating mixture of air and fuel in the cylinder. In this manner, complete elimination of the partial exhausting of the air-fuel mixture is obtained without the loss of fuel and the efficiency of a two-cycle internal-combusion engine increased substantially.

A particularly simple and advantageous manner of providing the scavenging fluid in a two-cycle engine is to connect the scavenging port to the crankcase. Air is introduced into the crankcase in timed relation to the movement of the piston and is compressed during the working stroke of the piston. First, the exhaust port is opened, then a predetermined number of crankshaft angle degrees later, the scavenging port is opened to admit the pressurized air from the crankcase into the cylinder.

The present invention thus provides a fuel injection system which establishes exceptional fuel utilization and consequent low operating cost and eliminates complicated valving structures having close tolerance requirements, and thus is low in initial cost. Improved atomization is provided which is particularly effective at low starting velocities as compared with a conventional engine.

The drawings furnished herewith illustrate the best mode presently contemplated for carrying out the invention.

In the drawings:

FIG. 4 is a side elevational view of FIG. 1 with parts broken away and sectioned to show certain details of the timing mechanism and injection system;

FIG. 5 is a fragmentary sectional view similar to a portion of FIG. 3 illustrating the valve in the position introducing the air-fuel mixture into the cylinder; and FIG. 6 is an enlarged sectional view taken on line 6—6 of FIG. 3.

Figure 1:
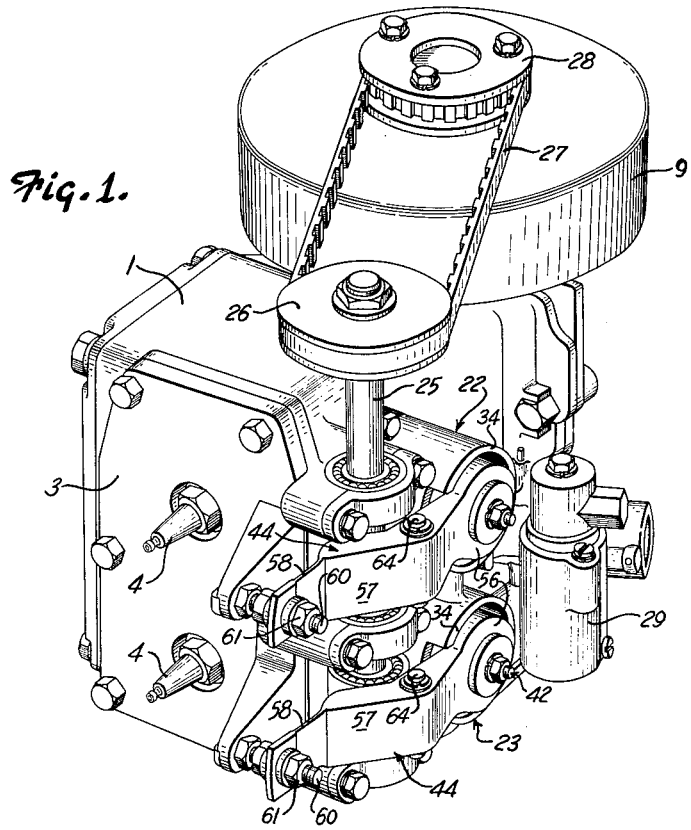
FIG. 1 is a perspective elevational view of a two-cycle internal-combusion engine constructed in accordance with the present invention.
Figure 2:
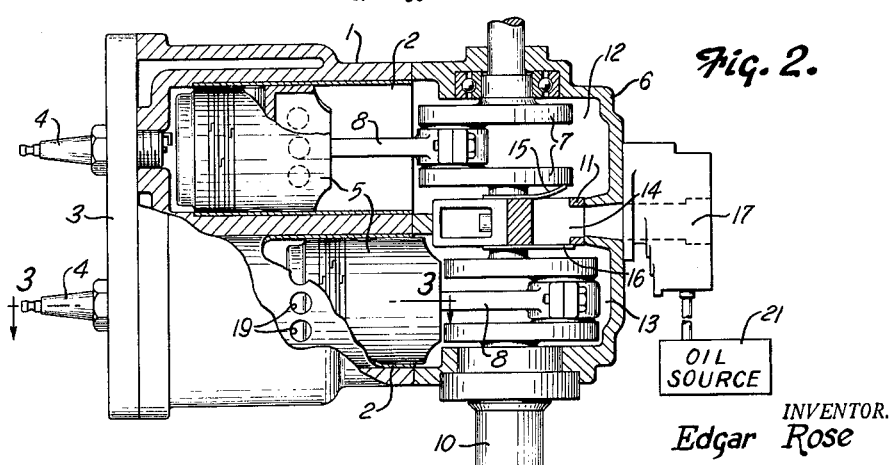
FIG. 2 is a vertical section through the cylinder block of the engine with parts shown in diagrammatic elevation.

Referring to the drawings and particularly to FIGS. 1 and 2, an in-line two-cylinder internal-combustion engine of the two-cycle variety is shown to illustrate the present invention and includes a cylinder block 1 having upper and lower cylinders 2 in vertically aligned and stacked relation. The forward end of each cylinder 2 is substantially closed and a head plate 3 is secured to the forward end block 1 to define cooling passages about the cylinders. The head plate 3 includes openings aligned with spark plugs 4 which are threaded into openings provided in the end walls of the cylinders 2. The spark plugs 4 are connected to a suitable firing and ignition system, not shown, to establish igniting sparks at the proper time in the cycle of each cylinder. A piston 5 is slidably disposed within each of the cylinders 2 in a conventional manner. A crankcase 6 is joined to and forms a part of the cylinder block 1 and supports a crankshaft 7 rotatably mounted perpendicularly to the cylinders 2. The crankshaft 7 is connected by individual connecting rods 8 to each of the pistons 5 to establish a rotary output in accordance with the movement of the pistons 5. A usual flywheel 9 is secured to the upper end of the crankshaft above the block 1 and crankcase 6. A drive coupling 10 is secured to the lower depending end of the crankshaft 7 for connection to any suitable load. The illustrated engine is particularly adapted to be mounted upon the upper end of a drive shaft housing, not shown, for forming an outboard motor.

The crankcase 6 includes a central bearing member 11 which supports the shaft 7 and divides the crankcase 6 into an upper crank chamber 12 and a lower crank chamber 13 respectively aligned with the upper and lower pistons 5. An induction chamber 14 is provided within the central bearing member 11 having passages communicating with the respective chambers 12 and 13. Reed valves 15 and 16 overlie the passages from the induction chamber 14 to chambers 12 and 13 to selectively control flow through the passages. An air-oil mixing unit 17 is secured to the chamber 14 to provide a selected mixture of air and oil into the chambers in response to opening of the respective reed valves 15 and 16.

Figure 3:
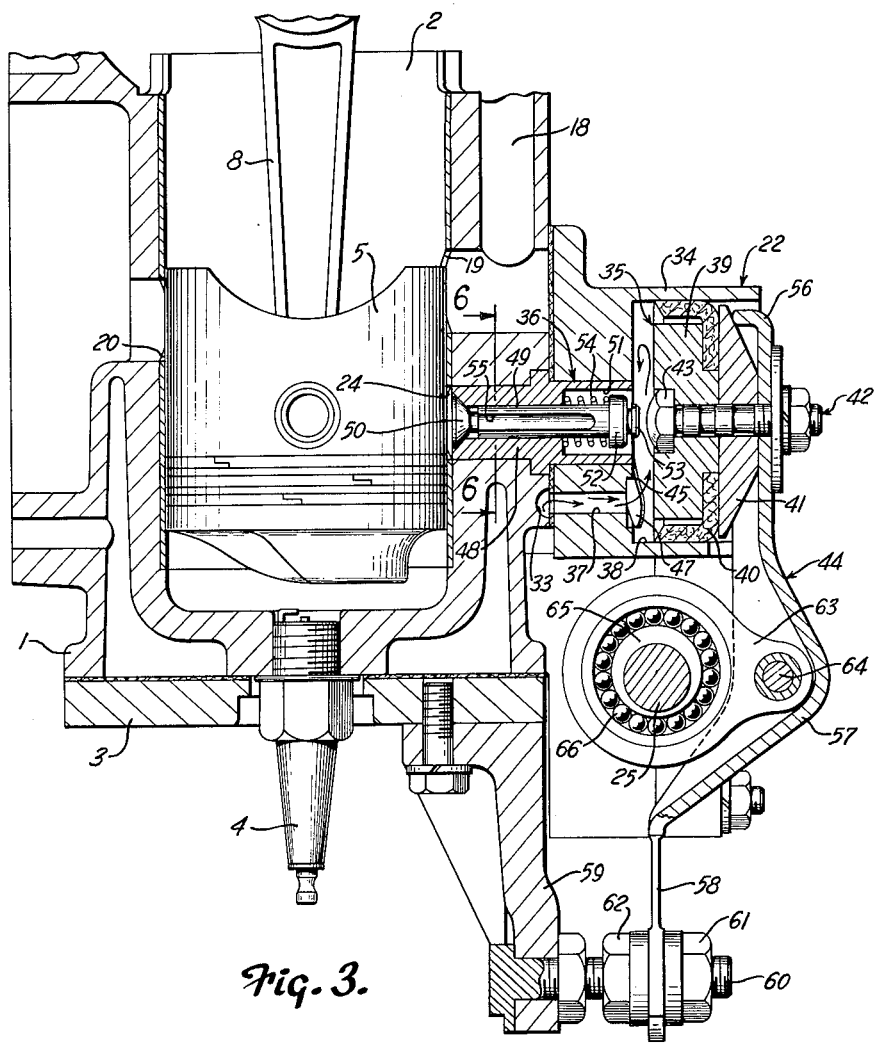
FIG. 3 is a fragmentary horizontal section through the lower cylinder taken on line 3—3 of FIG. 2.

Referring particularly to FIG. 3, a pair of air-oil transfer passageways 18 is provided in the block 1 communicating respectively with chambers 12 and 13 and terminating in scavenging ports 19 aljacent the innermost end of each corresponding cylinder 2. An exhaust port or passageway 20 is provided in each cylinder diametrically located with respect to the corresponding passageway 18. The piston 5 within each cylinder 2 is retracted during the exhaust portion of the cycle and opens ports 19 and 20. The port 19 is offset axially of the cylinder from port 20 and away from the cylinder head and is therefore opened shortly after the opening of port 20.

The air-oil mixing unit 17 is connected to any suitable oil source 21 to provide the desired air-oil mixture within the mixing unit 17 which is then transmitted to the induction chamber 14.

A pair of fuel-injection assemblies 22 and 23 are mounted on the block 1 on the side of the corresponding cylinder 2. The assemblies 22 and 23 inject a selected air-fuel mixture into the cylinders 2 in timed relation with the movement of the associated piston 5 through an air-fuel port 24 which is provided in the wall of each of the cylinders 2 displaced toward the cylinder head from the corresponding scavenging port 19 and preferably in the same radial plane as passageway 19.

Referring to FIG. 1, the fuel-injection assemblies 22 and 23 are operated by a common cam shaft 25 which is rotatably mounted in suitable bearings on the side wall of the cylinder block 1. The cam shaft 25 projects upwardly parallel to the axis of the crankshaft 7. A pulley 26 is fixedly secured to the upper end of the cam shaft 25 and is connected by a positive drive belt 27 to a pulley 28 which is bolted or otherwise fixedly secured to the upper surface of the flywheel 9. The cam shaft 25 is therefore driven in synchronism with the crankshaft 7 to properly operate the fuel injection assemblies 22 and 23 and introduce the air-fuel mixture into the cylinders 2 at the proper time for firing of the respective cylinders.

A common fuel metering unit 29 is connected to supply a selected mixture of air and fuel into the fuel injection assemblies 22 and 23. The fuel metering unit 29 is generally of a known and commercially available construction and no further description thereof is given.

The fuel metering unit 29 is secured to a common header 30, shown in FIGS. 1 and 4, which is secured to the block 1 between the fuel injection assemblies 22 and 23. A common passage 31 extends from the connection to the fuel metering unit 29 and is integrally formed and communicates with an upper cylinder passage 32 and a lower cylinder passage 33.

The fuel injection assemblies 22 and 23 illustrated in the drawings are identical and therefore only the lower injection assembly 23 is described in detail. Corresponding numbers are generally applied to corresponding elements in the upper fuel injection assembly 22 to provide corresponding description.

The fuel injection assembly 23 includes a housing 34 which is secured to the cylinder block 1. A precompression or pump section 35 is housed in the outer portion of the housing 34 and an injection valve section 36 is coaxially aligned with the pump section 35 and housed within the inner portion of the housing 34 and block 1 adjacent the cylinder port 24 in the wall of the cylinder 2. An inlet passage 37 is provided on the inner end of the housing offset from the valve section 36 and communicating with the lower cylinder passage 33 from the metering unit 29. The opposite end of inlet passage 37 terminates in the pump section 35.

The precompression or pump section 35 includes a cylindrical piston cavity 38 formed by recessing the outer end of the housing 34. A piston 39 is slidably mounted within the cavity 38 with an annular cup-shaped seal 40 disposed between the wall of the cavity and the side wall of the piston 39. The base of the cup-shaped seal 40 is apertured and disposed within a shoulder portion on the back or outer side of the piston 39. A clamp plate 41 overlies the back side of the piston 39 and seal 40 to clamp the seal in place. The assembly of piston 39, seal 40 and plate 41 is secured in stacked relation by a nut and bolt assembly 42 which extends through an axial opening therein. A bolt head 43 of assembly 42 projects slightly forwardly from the face of piston 39. The face of the bolt head 43 is generally convex to provide a bearing surface projecting into the cavity 38 for purposes subsequently described.

An eccentric-driven arm 44 is also secured to the piston 39 by the nut and bolt assembly 42 and is coupled to the cam shaft 25 for timed movement of the piston 39 in accordance with the rotation of the crankshaft 7.

Referring particularly to FIGS. 3 and 4, a reed valve 45 is secured within a complementing recess in the base of cavity 38 by a small bolt 46 or the like. The free end 47 of the reed valve 45 overlies the inlet passage 37 to the cavity 38 and acts to selectively open and close the passage in response to movement of piston 39. Reed valve 45 is constructed to normally dispose the free end 47 overlying and closing the passage 37. As the piston moves outwardly, a suction force on the reed valve 45 draws the free end 47 from passage 37 and opens the passage to admit the air-fuel mixture into the cavity 38. During forward or inward motion of the piston 39, the valve 45 closes and prevents further entrance of air-fuel mixture. In this manner, a preselected quantity of the air-fuel mixture is precompressed for injection into the corresponding cylinder 2 during each cycle of the cylinder operation.

The valve section 36 includes a valve insert 48 secured within the port 24 and an opening in the housing 34 coaxially aligned with the cavity 38 and interconnecting the cavity 38 to the cylinder 2. A valve stem 49 is slidably disposed within a central valve opening or passage in the valve insert 48 and includes an inner valve head 50 adapted to move into seating engagement with the adjacent end of insert 48 as shown in FIG. 3. The outer end of the valve stem 49 terminates within an enlarged recess 51 in the outer end of the valve insert 48. A spring retainer 52 is secured to the end of the stem 49 axially inwardly of a valve stem end button 53. A coil spring 54 encircles the stem 49 between the base of the recess 51 and the adjacent side of the spring retainer 52. The spring 54 is tensioned to continuously urge the valve stem 49 outwardly to seat the valve head 50 upon the adjacent end of the valve insert 48. The valve passage is thus closed and prevents movement of the air-fuel mixture into the cylinder 2.

The valve stem end button 53 is aligned with the bolt head 43 of the nut and bolt assembly 42. At the end of the inward stroke of the precompression piston 39, the bolt head 43 engages the adjacent head of valve stem end button 53 and positively moves the valve stem 49 against the force of spring 54 to rapidly open the valve opening or passage and admit the compressed air-fuel mixture from cavity 38 into the cylinder 2, as shown in FIG. 5.

The amount of air introduced through valve section 36 is selected such that when combined with the air introduced through port 19 the proper air-fuel mixture is provided. The total frictional losses are minimized because the portion of the air introduced externally of the carburetor is not subjected to the normal pressure drop encountered in the carburetor. The smaller amount of air introduced through the carburetor allows the introduction to the cylinder at a greater velocity than if all the air is introduced through the carburetor. The high velocity of the air flow prevents fuel particles from settling out and assists the atomization of the air-fuel charge.

Referring to FIGS. 3, 5 and 6, the valve stem 49 is provided with a plurality of circumferentially distributed longitudinally extending grooves or passages 55 which extend between the enlarged recess 51 and the cylinder 2 to provide a plurality of passages for introducing the air-fuel mixture into the cylinder 2. The plurality of passages 55 assist in the atomization of the air-fuel mixture and increases the efficiency of starting, particularly at low engine speeds and when the engine is cold.

The movement of the precompression piston 39 is controlled by the rotation of the cam shaft 25 and the eccentric-driven arm 44, as follows.

Referring particularly to FIGS. 3 and 5, the eccentric-driven arm 44 is an elongated member including an apertured boss 56 secured to the piston 39 by the nut and bolt assembly 42. The arm 44 projects parallel to the cylinders 2 along the side of the cylinder block 1 and includes an offset channel-shaped middle section 57 terminating in a flexible section 58 at the end of the arm opposite boss 56. The flexible section 58 allows movement of the outer end of the arm 44 and the attached piston 39. Any other suitable connection may be employed to establish the desired movement of arm 44.

A bracket 59 projects from the head plate 3 and the flexible section 58 is secured thereto by a bolt 60 which projects through a suitable opening in the flexible section 58. Lock nuts 61 and 62 are threadably disposed on the bolt 60 on opposite sides of the flexible section 58 of arm 44. By movement of the lock nuts 61 and 62 inwardly or outwardly of the bolt 60, the location of the flexible section 58 and thus of the arm 44 is determined.

A connecting link 63 is pivotally secured within the channel-shaped middle section 57 of arm 44 by a pivot pin 64 which is fixedly secured to the flanges of the section 57 of arm 44. The opposite end of link 63 is enlarged and includes an opening through which the cam shaft 25 projects. An eccentric cam 65 is secured to or integrally formed with the cam shaft 25 and rotates within the opening in link 63 to continuously reposition the link 63 in accordance with the eccentricity of the cam surface. A ball bearing unit 66 is disposed between the cam 65 and the adjacent circumference of the opening in link 63 to reduce friction to a minimum.

As the cam shaft 25 rotates, the link 63 is caused to oscillate in an orbital path in accordance with the eccentric shape of the cam 65. The outer end of the link 63 moves perpendicularly to the direction of the arm 44 and the attached arm 44 pivots by flexing of section 58 secured to the bolt 60. The arm 44 at boss 56 is secured to the piston 39 and restricted to substantially rectilinear axial movement in accordance with the axis of the piston 39 and the piston cavity 38. The slight angular movement of piston 39 is permitted by the seal 40. Therefore, the piston 39 is continuously reciprocated within the cavity 38 in accordance with the rotation of the cam shaft 25 which in turn is controlled by the rotation of the crankshaft 7.

The operation of the illustrated embodiment of the invention is described as follows.

Referring particularly to FIG. 3, the lower cylinder 2 is illustrated with the piston 5 near the end of the compression stroke. An air-fuel charge has been previously introduced into the cylinder and is compressed between the head of cylinder 2 and the face of the piston 5. At this time the spark plug 4 is ignited to establish an ignition spark which fires the compressed gases within the cylinder 2 in accordance with known phenomena. The force of the burning gases acts upon the piston 5 and eventually moves the piston backwardly through the cylinder 2 with the motion being transmitted to the crankshaft 7 through the connecting rod 8. The exhaust port 20 and the scavenging port 19 are closed during this working stroke of the cycle by the piston wall which overlies the respective ports. The valve section 36 is held closed by the pressure of the spring 54 on the valve stem 49.

The piston 39 of the pump section 35 is moving outwardly of the cavity 38 during this portion of the cycle. During the outward movement of the piston 39, the reed valve 45 opens and the air-fuel mixture from the metering device 29 passes through the inlet passage 37 and into the cavity 38. The closed valve section 36 prevents passage into the cylinder 2.

As the piston 5 moves inwardly through the cylinder 2 and approaches the bottom end of a stroke, the exhaust port 20 is uncovered to discharge the burnt exhaust gases to a suitable exhaust passage. The final inward movement of the piston 5 uncovers the scavenging port 19 and the compressed air-oil mixture moves through the port 19 to positively force the burnt gasses through the exhaust port 20. The power stroke movement of the piston 5 compresses the air-oil mixture within the crankcase 6 such that the air-oil mixture is pressurized and positively forced into the cylinder 2 to effect complete and rapid scavenging.

During this portion of the cycle, the cam shaft 25 and attached cam 65 are rotated to a position withdrawing the precompression piston 39 away from the valve section 36 and bolt head 43 away from head 53. The tension of spring 54 maintains the valve section 36 closed during this portion of the cycle.

As the cycle continues, the piston 5 reaches the bottom position and the rotation of the crankshaft then forces the piston 5 to start a new compression stroke. Simultaneously, the piston 5 begins to close port 19 and the exhaust port 20. In timed relation therewith, the cam 65 is rotated to move link 63 inwardly. This motion of link 63 moves the outer end of the arm 44 inwardly and forces the piston 39 into the cavity 38. The inward movement of piston 39 closes the reed valve 45 and compresses the air-fuel mixture within the cavity 38.

The tension of the spring 54 encircling valve stem 49 is sufficient however to prevent the pressure of the compressed air-fuel mixture from opening the valve section 36 until the head 43 of the nut and bolt assembly 42 engages the valve stem button 53 of the valve stem 49 and positively acts to open the valve section 36. The compressed air-fuel mixture then moves rapidly from pump chamber 38 through the several passages 55 in stem 49 and into the cylinder 2 in a finely divided state. This portion of the stroke is timed, as shown in FIG. 5, to generally correspond to the initiating of the return or compression stroke of the piston 5. At this time, substantially all of the burnt gases are eliminated from the cylinder 2. During the slight momentary portion of the cycle during which the piston 5 again moves to close the exhaust port 20 and the scavenging port 19, none of the air-fuel mixture can move the distance across the cylinder 2 and out through the exhaust port 20.

The mixture of air and fuel introduced into the cylinder 2 is selected such that when mixed with the air-oil mixture presently within the cylinder 2, it provides the correct air-fuel mixture for most efficient firing and operation of the engine 1. The scavenging of the exhaust gas by the air-oil mixture from the crankcase 6 is sufficiently completed such that the exhaust port 20 is completely covered before any of the fresh air-fuel charge entering the cylinder 2 can be expelled through the exhaust port.

The separate air flow and air-fuel mixture flow permits the use of much higher pressure drops, and thus velocities of the air-fuel flow without reduction in volumetric efficiency of the engine. The higher air-fuel velocities prevent the settling of fuel particles in favor of the lower cylinder. The use of one metering unit for a pair of cylinders establishes an improved and more uniform fuel distribution.

The construction of the illustrated embodiment of the invention does not require close tolerances within the fuel injection assembly. The sequential application of a scavenging air or the like and subsequent introduction of the fuel mixture into the cylinder at a time when it cannot be expelled or discharged through the exhaust port maintains the engine operating at top fuel utilization and efficiency.

Various modes of carrying out the invention are contemplated as being within the scope of the following claims particularly pointing out and distinctly claiming the subject matter which is regarded as the invention.

I claim:

1. In a fuel supply system for an internal-combustion engine having a cylinder, an exhaust port and a scavenging inlet port in the cylinder arranged for generally simultaneous opening and closing to establish a scavenging period for discharging exhaust gases through the exhaust port, an air-fuel inlet port, a valve means axially movable in said air-fuel inlet port and biased to hold the fuel inlet closed, a source of an air and fuel mixture under pressure, and timing means mechanically coupled to said valve means and operatively actuated in synchronism with piston movement to positively open the valve during the terminal scavenging portion of the exhaust cycle to introduce a preselected charge of the air and fuel mixture.

2. In a fuel supply system for an internal-combustion engine having a cylinder, an exhaust port and a scavenging inlet port in the inner portion of the cylinder and arranged for generally sequential opening during a scavenging period for discharging exhaust gases through the exhaust port, a pressurized source of scavenging air connected to said scavenging inlet port, a fuel inlet port in substantially the same radial plane as the scavenging port, a valve means axially movable in said fuel inlet port and having means biasing the fuel inlet closed, a compression chamber disposed axially outwardly of said port, a piston operable axially in said chamber and movable to compress an air-fuel mixture therein for discharge through said port as the compression piston moves inwardly, a source of air-fuel mixture for said compression chamber, and timing means operatively actuated in synchronism with engine piston movement to reciprocate said compression piston and cause the same to engage said valve means and open the valve at a preselected point in the engine cycle previous to commencement of ignition.

3. In a fuel supply system for an internal-combustion engine having a cylinder with an air-fuel port and a separate air port in the cylinder, a pressurized source of air for introduction through said separate air port, a precompression chamber adapted to precompress an enriched air-fuel mixture to a selected pressure level and having a movable member, a passage connecting the chamber to the air-fuel port, a valve in said passage and air-fuel port, resilient means connected to said valve and stressed to hold said air-fuel port closed, said stress being greater than the maximum pressure established in said chamber, means operatively connecting the valve to the movable member to mechanically open the valve and inject the precompressed air-fuel mixture into the cylinder, and means to operate said precompression chamber in timed relation to establish proper introduction of the enriched air-fuel mixture into the cylinder in timed relation to the introduction of air through the separate air port to establish a desired operating air-fuel mixture in the cylinder.

4. In a fuel supply system for an internal-combustion engine having a cylinder block including a plurality of cylinders slidably supporting pistons and having a crankshaft connected to said pistons and supported in a crankcase constituting an extension of the cylinder block, each of said cylinders having an enriched air-fuel port and a separate air port, means to introduce air into the cylinder through said separate air port, a main valve mounted within the air-fuel port and having means continuously urging the valve to close the air-fuel port, a precompression chamber coaxially arranged adjacent the back side of the valve with the air-fuel port terminating therein and having an inlet opening in the base, means to supply an enriched air-fuel mixture into the precompression chamber through the inlet opening, a valve mounted to open and close the last-named opening, a piston slidably mounted in the chamber to actuate said valve and compress the air-fuel mixture in the chamber, an actuator connected to the piston and engaging the main valve to open the air-fuel port, an arm movably mounted and secured at one end to the precompression piston, a cam rotated in synchronism with the crankshaft and coupled to move the arm, and means to drive said cam to sequentially precompress said air-fuel mixture and open the main valve to introduce the air-fuel mixture into the cylinder.

5. The construction of claim 4 wherein the end of the arm opposite the piston is fixedly secured to the relatively stationary member and includes a flexible section between the cam and the stationary member to permit flexing of the arm for moving the piston within the precompression chamber.

6. In a fuel supply system for an internal-combustion engine having a cylinder block including a plurality of cylinders slidably supporting pistons and having a crankshaft connected to said pistons and supported in a crankcase constituting an extension of the cylinder block, said crankcase being divided into compartments aligned with and forming an extension of said cylinders, each of said cylinders having an exhaust port and an air scavenging port, passageways connecting each air scavenging port to the aligned crankcase compartment, an air-oil mixing unit connected to the crankcase to introduce a mixture of air and oil to the crankcase compartments in timed relation to the movement of the corresponding pistons, the air-oil mixture being compressed in the crankcase compartment during the working stroke of the corresponding piston, an air-fuel port in each cylinder axially outwardly of said exhaust port and said scavenging port, a pressurized source of an air-fuel charge connected to the air-fuel port, and normally closed valve means disposed to move axially in said air-fuel port, and means actuating said valve means in correlation to engine piston movement to introduce the air-fuel charge after the scavenging of exhaust gases of the previous cycle.

7. In a fuel supply system for an internal-combustion engine having a cylinder block including a plurality of cylinders slidably supporting pistons and having a crankshaft connected to said pistons and supported in a crankcase constituting an extension of the cylinder block, said crankcase being divided into compartments aligned with and forming an extension of said cylinders, each of said cylinders having an exhaust port and a scavenging port, a passage connecting each scavenging port to the crankcase, an air-oil mixing unit connected to the crankcase to introduce a mixture of air and oil to the crankcase compartments in timed relation to the movement of the corresponding pistons, the air-oil mixture being compressed during the working stroke of the piston, an air-fuel port in each cylinder axially outwardly of said exhaust port and said scavenging port, a main valve slidably mounted within the air-fuel port, a spring means continuously urging the valve outwardly to close the air-fuel port, a precompression chamber coaxially arranged adjacent the back side of the valve and having the air-fuel port terminating therein and having an inlet opening in the base, an inlet valve mounted to open and close the opening, a piston slidably mounted in the chamber to actuate said valve and compress the air-fuel mixture in the chamber, an actuator connected to the piston and engaging the main valve to open the air-fuel port, a spring arm secured at one end to the precompression piston and at the opposite end to a relatively stationary member, a cam rotated in synchronism with the crankshaft and coupled to move the arm, said arm including a flexible section between the cam and the stationary member to permit flexing of the arm and movement of the piston, and timing means to drive said cam to sequentially precompress said air-fuel mixture and open the main valve substantially coincident with the complete opening of the scavenging port.

8. In a fuel supply system for an internal-combustion engine having a cylinder, an exhaust port and a scavenging inlet port in the cylinder arranged for generally simultaneous opening and closing to establish a scavenging period for discharging exhaust gases through the exhaust port, a fuel inlet port defined by a valve insert secured within the wall of the cylinder and having a central opening with a valve seat at the cylinder wall, a valve stem slidably journaled within the central opening and having a head adapted to engage the valve seat to close the opening, the central opening being enlarged adjacent the outer portions of the valve insert, a stop on the valve stem within the enlarged opening, a coil spring compressed between the stop and the base of the enlarged opening to continuously urge the valve stem outwardly to close the central opening, a housing having an opening accommodation the projecting end of the valve insert and defining an enlarged precompression cavity coaxially extending outwardly and radially from the valve insert, an air-fuel inlet passageway in the housing extending from the base of the cavity, an air-fuel metering unit connected to admit a predetermined mixture of air and fuel to the cavity, a reed valve secured to the base of the cavity and overlying the air-fuel passageway to selectively close the latter, a piston slidably disposed in the cavity and having an operating member projecting forwardly from the face in alignment with the valve stem, the operating member engaging the valve stem to open the central opening upon predetermined inward movement of the precompression piston, a cantilever arm fixed at one end to a stationary portion of the engine and at the opposite end to the back side of the precompression piston, said arm having a thin flexible portion adjacent the fixed end, a cam shaft mounted adjacent and in a plane normal to the central portion of the arm, a cam secured to the shaft, a connecting link pivotally secured to the arm and having a cylindrical opening containing said cam whereby said arm moves axially of the precompression piston for each revolution of the cam, and means coupling the cam shaft to the crankshaft to actuate the precompression piston to cyclically and in sequence draw the air-fuel mixture into the cavity, precompress the air-fuel mixture within the cavity, engage and positively move the valve stem to discharge the pressurized air-fuel mixture into the cylinder, and to release the valve stem.

9. In a fuel supply system for an internal-combustion engine having a cylinder, a precompression chamber having a movable member to precompress an air-fuel mixture to a selected pressure level, a valve opening connecting the chamber to the cylinder, a valve stem slidable in said valve opening and having a valve head immediately adjacent the cylinder, means biasing the valve head to close said passage, said stem having a plurality of longitudinal grooves defining a plurality of passageways with said valve opening to assist in atomization of the air-fuel mixture within the cylinder, and means connecting the movable member and said valve stem to actuate the valve stem in timed relation to establish predetermined injection of the air-fuel mixture into the cylinder.

References Cited by the Examiner
UNITED STATES PATENTS

| | | | |
|---|---|---|---|
| 1,110,332 | 9/14 | Miller | 123—73 |
| 1,219,458 | 3/17 | Herbert | 123—75 |
| 1,601,274 | 9/26 | Warrington | 123—69 |
| 1,632,478 | 6/27 | Hubbell | 123—73 |
| 1,778,156 | 10/30 | Kelsey | 123—32 |
| 1,967,682 | 7/34 | Ochtman | 123—73 |
| 2,267,333 | 12/41 | Jacoby et al. | 123—73 |
| 2,771,868 | 11/56 | Knuth | 123—73 |
| 2,952,252 | 9/60 | Geatty | 123—73 |
| 2,970,582 | 2/61 | Hull | 123—69 |

FOREIGN PATENTS

| | | |
|---|---|---|
| 522,427 | 3/21 | France. |
| 805,898 | 9/36 | France. |
| 162,186 | 7/05 | Germany. |

FRED E. ENGELTHALER, *Primary Examiner.*